March 5, 1968 — C. COTTIN ET AL — 3,372,183

META-ACYLPHENYL CARBAMATES

Filed April 24, 1964

United States Patent Office 3,372,183
Patented Mar. 5, 1968

3,372,183
META-ACYLPHENYL CARBAMATES
Camille Cottin, Lyon, and Jacques Mocotte, Champagne-au-Mont-d'Or, France, assignors to Progil, Paris, France
Filed Apr. 24, 1964, Ser. No. 362,220
Claims priority, application France, Apr. 25, 1963, 932,596
13 Claims. (Cl. 260—471)

ABSTRACT OF THE DISCLOSURE

The present disclosure relates to carbamic esters of the following general formula

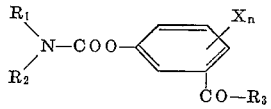

Figure 1:
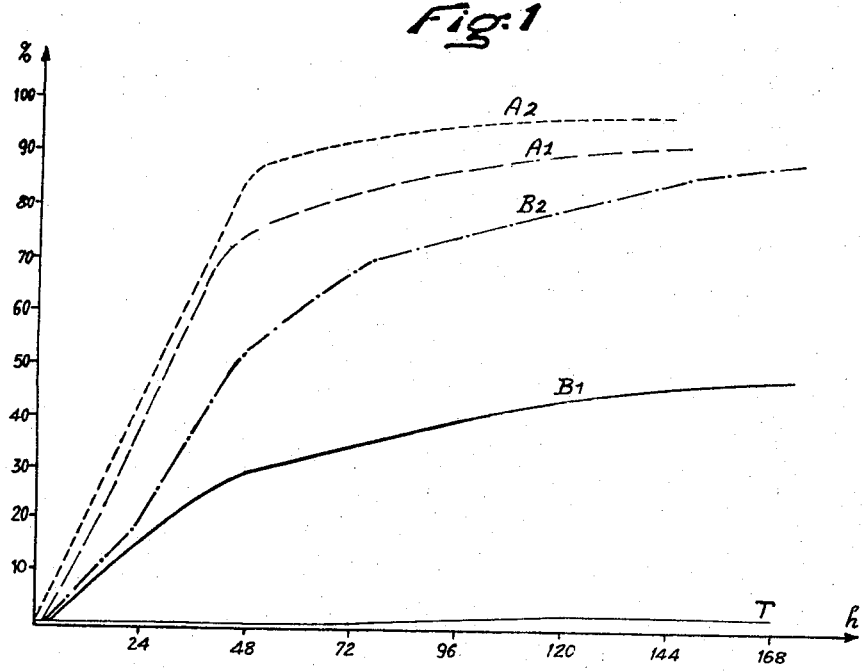

wherein $R_1$ and $R_2$ are the same or different and include hydrogen atoms, alkyl, alkenyl, cycloalkyl, cycloalkylene, aryl, or alkyl radicals, or both members of a heterocyclic ring; $R_3$ is an alkyl radical; X is an electronegative group such as a halogen or the nitro group; and $n$ is an integer of 0–4. These carbamic esters have general biocidal properties including bactericidal and fungicidal properties; they have good activity against sea molluscs and nematodes and are excellent insecticides. The carbamates may be used as powders, suspensions, solutions, or emulsions. They may be applied by spraying, coating or impregnating articles or materials therewith.

---

The present invention relates to a new class of chemical compounds which are derived from carbamic acid and which are endowed with extremely interesting biocidal properties. The invention is also concerned with biocidal compositions which contain these substances.

It is known that numerous aryl esters of carbamic acid monosubstituted or disubstituted on the nitrogen atom have good insecticidal properties. One of the most active compounds of this family is α-naphthyl N-methyl carbamate, which has been marketed for several years under the name of "Sevin."

In the prior known carbamic derivatives, the aryl radical, which can for example be a phenyl, naphthyl, indanyl, acenaphthyl radical, possibly comprises one or more halogenated substituents, particularly chlorine. The only compound so far described in which the aryl nucleus comprises an acyl —CO—R substitution, is para-acetylphenyl N-methyl carbamate of the formula

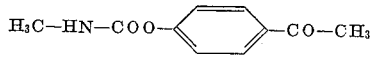

Now the insecticidal activity of this compound has been found to be very weak and in any case clearly inferior to that of "Sevin" or homologues of this latter (French Patent No. 1,166,551).

It has now been found that, contrary to that which could be expected, the phenyl esters of carbamic acid, in which the phenyl nucleus comprises an acyl group in the meta position constitute outstanding insecticides which are more active than the carbamic derivatives already known for this use, particularly the "Sevin" and have in addition very general biocidal properties, such as bactericidal, fungicidal, molluscidal, nematocidal properties, etc.

The compounds according to the invention may be represented by the following general formula:

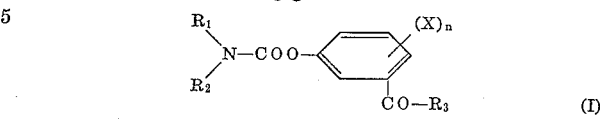

in which:
$R_1$ and $R_2$ are identical or different and may be: a hydrogen atom or an alkyl, alkenyl, cycloakyly, cycloalkenyl, aryl or aralkyl radical, it being possible for one or more of these radicals to comprise one or more substituents which are more particularly chosen from the halides or groups such as the alkyl and nitro groups; in addition, $R_1$ and $R_2$ can participate in the formation of a ring or a heterocyclic ring;

$R_3$ represents a hydrocarbon radical, particularly an alkyl radical;

X designates an electronegative group, such as more particularly a halogen atom or the $NO_2$ group;

$n$ is an integer which may assume the values 0 to 4.

As non-limitative examples, the following compounds corresponding to the Formula I according to the invention may be referred to:

m-Acetylphenyl carbamate, m-propionylphenyl carbamate, m-butyrylphenyl carbamate, m-(α-methylacetyl)-phenyl carbamate; (m-acetyl-p-chloro)-phenyl carbamate; m-acetylphenyl-N-methyl carbamate, m-butyrylphenyl - N - methyl carbamate, m-acetylphenyl-N-ethyl carbamate, m-(α-methylacetyl)-phenyl-N-ethyl carbamate, m-acetyl-phenyl-N-propyl carbamate, m-acetylphenyl-N-butyl carbamate, m-acetylphenyl-N-amyl carbamate; m-acetyl-phenyl-N,N-dimethyl carbamate; m-acetylphenyl-N,N-diethyl carbamate; m-acetylphenyl-N,N-dibutyl carbamate; m - acetylphenyl - N,N-diisopropyl carbamate; m-acetylphenyl-N,N-diisobutyl carbamate; m-acetylphenyl-N-methyl-N-ethyl carbamate, m-(α-methyl-acetyl)-phenyl-N-methyl-N-propyl carbamate, m-acetyl-phenyl-N-ethyl-N-butyl carbamate, m-acetylphenyl-N-methyl-N-amyl carbamate, m-acetylphenyl-N-isopropyl-N-butyl carbamate, m-acetyl-phenyl-N-methyl-N-isobutyl carbamate; (m - acetyl - p - chloro)-phenyl-N,N-dimethyl carbamate; m-acetylphenyl-N-methyl-N-phenyl carbamate, m - acetylphenyl - N-ethyl-N-phenyl carbamate, m-acetylphenyl - N - butyl - N-phenyl carbamate; m-acetyl-phenyl - N,N - diphenyl carbamate; (m-acetyl-p-chloro)-phenyl - N,N - diphenyl carbamate; (o-chloro-m-acetyl-p-chloro)-phenyl-N,N-diphenyl carbamate; m-acetylphenyl-N-methyl-N-(3,4-dichloro)-phenyl carbamate, m-acetylphenyl - N-methyl-N-(2,4,6-trichloro)-phenyl carbamate; m-acetylphenyl - N,N - dichloro-3,4-phenyl carbamate; m-acetylphenyl-N,N-di-(2,4,6-trichloro)-phenyl carbamate; etc.

The compounds covered by the general Formula I can be prepared by application of the processes already known for obtaining carbamic esters which may or may not be substituted on the nitrogen atom, namely, one of the methods indicated below.

(a) Reaction of an isocyanate on a phenol, possibly substituted by one or more electronegative groupings, carrying a —CO—$R_3$ group on the nucleus, in the meta position with respect to OH, $R_3$ having one of the meanings already indicated above. This reaction, preferably carried out in the presence of a catalyst, which is generally a tertiary amine, can obviously only be suitable for the preparation of carbamates monosubstituted on the nitrogen.

(b) Reaction between a chloroformate and an appropriate amine, according to the diagram:

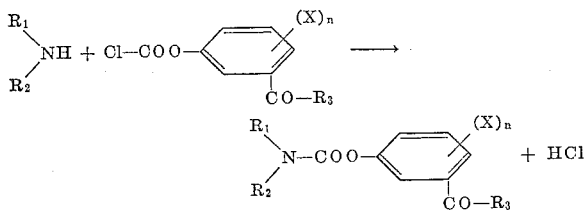

it being possible for this amine to be gaseous ammonia when it is desired to obtain a carbamic ester which is not substituted on the nitrogen. The operation generally takes place at normal temperature, in the presence of an HCl acceptor, which can for example be the amine itself.

(c) A third method consists in reacting a carbamyl chloride:

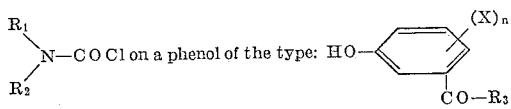

in the presence of pyridine as HCl acceptor.

According to one variant of this process, it is particularly advantageous to effect the reaction in the absence of any HCl acceptor by simply heating the reagents under reflux in the presence or absence of a solvent. The hydracid which is formed is eliminated from the reaction medium, either progressively or even after the formation of the desired carbamic ester.

The new products according to the invention have very general biocidal properties. They have a bactericidal and fungicidal power at least equal to that of the products currently in use commercially. They also have a good activity against sea molluscs and nematodes. In particular, they constitute excellent insecticides, the activity of which is generally far superior to that of the best insecticides of the already known group of carbamates, particularly of "Sevin."

The pesticides according to the invention may be used in various conventional forms, such as powders, suspensions in inert liquids, solutions or emulsions.

They can be advantageously applied by spraying, coating or impregnating articles or materials with a solution of the agent in one or more solvents which may be for example: aromatic hydrocarbons such as benzene, toluene, xylene, decaline; chlorinated hydrocarbons of the type of carbon tetrachloride, dichloroethane, trichloroethane, perchloroethylene, or mono- or/and di-chlorobenzene; esters or ethers, such as methyl, ethyl, propyl, isopropyl, butyl, isobutyl acetates, propionates or butyrates, as well as dioxane and others; ketones, namely acetone, methyl-ethylketone, acetonyl-acetone, cyclopentanone, cyclohexanone etc.

More often than not, the solutions of pesticides according to the invention contain, in practice, 0.5 to 20% by weight of the active biocidal substance and preferably 1 to 10%.

In certain applications it may be better to use an aqueous emulsion rather than a solution; the emulsion is obtained, as well known, with the aid of tensioactive agents, for example with salts of alkylsulfonates or alkyl-arylsulfonates, alkylsulfates, alkylamine-sulfonates, alkylphenol polyethers, esters of fat acids with polyols, adducts of alkylene oxides with long chain mercaptans and so on.

On the other hand, the new biocidal substances may be used in the form of a fine powder intimately mixed with about 0.05 to 5% of a tensioactive agent which makes that the powder becomes water wettable. The powder may also contain an inorganic pulverulent support of known type, such as talcum, kaolin, bentonite, fuller's earth, silica gel, alumina gel and other, the content of which in the mixture may be for example 10 to 95% of the mixture. Of course, mixtures of the biocidal agents with such charges, that is with inorganic pulverulent supports, may also be made without tensioactive agent, particularly when the powder has to be used in the dry state and not to be diluted with water.

In general the active substance, that is the biocidal agent or pesticide, may be furnished to users in the form of compositions which contain, by weight, 0.5 to 99.95% of it, the balance being constituted by one or more inert materials such as solvents, dispersing liquids, water, inorganic pulverulent charges, tensioactive agents or/and eventually other biocide substances.

The following examples, which are of non-limitative nature, show how the invention may be carried into practice. The examples numbered 1 to 7 describe the preparation and the characteristics of some of the products according to the invention. Those examples which are numbered 8 to 10 illustrate non limitatively the most typical properties and the possibilities of using a certain number of the carbamic esters according to the aforementioned Formula I.

EXAMPLE 1

Into a spherical flask equipped with a stirrer device, a thermometer and a dropping funnel, there is introduced a solution of m-acetylphenyl chloroformate in benzene (obtained by reaction of phosgene on m-hydroxy-acetophenone). Gaseous ammonia is caused to bubble at ordinary temperature into the flask until the reaction has ended. After the ammonium chloride which has formed has been removed by washing with water, the organic phase is decanted and this latter is dried over anhydrous $CaCl_2$. Some of the benzene is then eliminated by distillation and cooling is allowed to take place. The m-acetylphenyl carbamate which crystallises is filtered and then recrystallised from benzene. A yellowish white solid is obtained which melts at 101–102° C.

EXAMPLE 2

Into a spherical flask equipped with a stirrer device, a thermometer and a dropping funnel, and containing an ethereal solution of m-acetylphenyl chloroformate, there is progressively added at normal temperature the adequate quantity of ethylamine, also in solution in diethyl ether. After completing the addition, the amine hydrochloride which has formed is removed by washing with water. The organic phase is then decanted, this being dried over anhydrous $CaCl_2$. By adding hexane to the dry ethereal solution and then cooling while stirring, a precipitate of crude m-acetylphenyl-N-ethyl carbamate is obtained and this, when recrystallised from carbon disulphide melts at 56–57° C.

EXAMPLE 3

Into a spherical flask equipped with a stirrer device and a dropping funnel and containing an ethereal solution of dimethylamine, there is added dropwise at normal temperature an also ethereal solution of m-acetylphenyl chloroformate. After completing the addition, the amine hydrochloride is removed by washing with water, the organic phase is decanted, this latter is dried over $CaCl_2$ and then the ether is eliminated by evaporation. Distillation at 0.7 mm. Hg of the liquid residue which is obtained yields the m-acetylphenyl-N,N-dimethyl carbamate, which distils over at 135–136° C.

EXAMPLE 4

Operating in the same manner as in Example 3, but replacing the dimethylamine by diethylamine, there is obtained the m-acetylphenyl-N,N-diethyl carbamate, which boils at 160–161° C./1.2 mm. Hg.

EXAMPLE 5

Into a spherical flask equipped with a stirrer device, a thermometer and a condenser, there are introduced: 1 mol. of crude m-hydroxyacetophenone in solution in 700 cc. of chloroform and then progressively a solution of 1.1 mol. of methyl isocyanate in 300 cc. of chloroform, and finally 2 to 3 drops of triethylamine. The reaction is allowed to take place for 2 days, then the few insoluble impurities are eliminated by filtration and the liquid residue is distilled. In this way, 0.9 mol. of crude m-acetylphenyl-N-methyl carbamate is obtained, and when this is crystallised from perchloroethylene and recrystallised from carbon tetrachloride, a pure white solid product is obtained which melts at 78° C.

EXAMPLE 6

By operating as indicated in Example 5, but replacing the methyl isocyanate by 1.2 mols of isopropyl isocyanate, there is obtained the crude m-acetylphenyl-N-isopropyl carbamate, and when this has been crystallised from a mixture of equal volumes of carbon tetrachloride and hexane, a pure product melting in the region of 71° C. is obtained.

EXAMPLE 7

Into a spherical flask equipped with a thermometer and a stirrer device, there is introduced 1 mol. of m-hydroxyacetophenone in 800 cc. of chloroform and then there are added, while cooling 1.1 mol. of 3,4-dichlorophenyl isocyanate in solution in 700 cc. of chloroform and about 1 cc. of triethylamine. The desired carbamate precipitates instantaneously in the medium. The precipitate is filtered and washed with hexane. After recrystallisation of the solid from monochlorobenzene, the m-acetylphenyl-N-dichloro-3,4-phenyl carbamate is obtained as a white solid, melting between 193 and 196° C.

EXAMPLE 8

With the object of studying the insecticidal activity of one of the products according to the invention, namely, the m-acetylphenyl-N-methyl carbamate, solutions of this product are ground very finely in acetone inside Petri dishes, in accordance with the well known method. A series of specimen dishes is thereby obtained which contain increasing doses of the product to be examined, namely, 3 to 250 mg. per square meter of surface. One Petri dish without carbamate is kept for comparison purposes. The same number of insects to be tested (for example 20, of which 10 are male and 10 female) are then introduced into each dish and the number of dead insects is counted at regular intervals.

In order to establish a comparison with one of the best known insecticides in the carbamate series, namely α-naphthyl-N-methyl carbamate (or "Sevin"), the same preparations as above are carried out, using the same doses of product, substituting this carbamate for the m-acetylphenyl-N-methyl carbamate.

Figure 2:
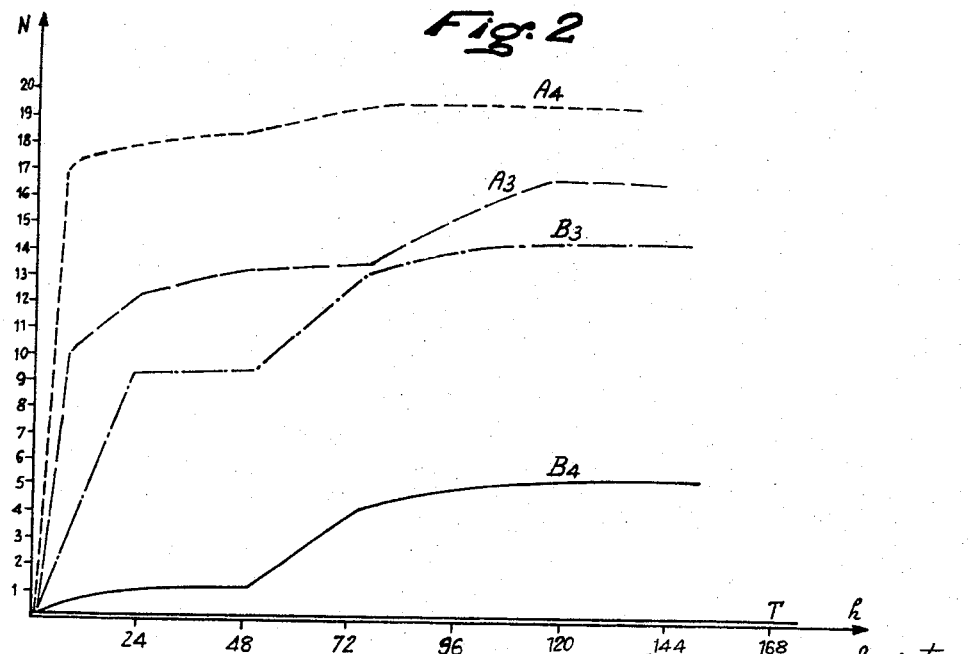

The results obtained are represented (only partly, for greater clarity) in the curves of FIGURES 1 and 2 accompanying the present specification.

In FIGURE 1, there is plotted as ordinate the percent of mortality of insects of the Calandra granaria type, and, as abscissa, the number of hours during which the said insects are in contact with the insecticide being investigated. The curves ($A_1$) and ($A_2$) correspond respectively to the doses of 3 mg. and 29.5 mg. of m-acetylphenyl-N-methyl carbamate per square meter of neutral charge, while the curves ($B_1$) and ($B_2$) correspond to the same respective doses of α-naphthyl-N-methyl carbamate. The comparison curve (T) is a straight line which practically coincides with the axis of the abscissae. It can more particularly be seen that:

On the one hand, for a given concentration of insecticide and for a given time, the mortality rate is about 2 times higher in the case where the m-acetylphenyl-N-methyl carbamate is used.

On the other hand, even with a high concentration (curve $B_2$) of α-naphthyl-N-methyl carbamate, the mortality rate only reaches about 65% after 72 hours and then 80% after 144 hours, and this latter limit constitutes a maximum, whereas on the contrary, the use of m-acetylphenyl-N-methyl carbamate permits of attaining a mortality rate of about 85% in less than 48 hours, and this rate approaches 90% after 72 hours and it increases still further during the following hours of exposure of the insects.

FIGURE 2 shows the results obtained following the mortality tests on cockroaches of the Blattella germanica species, carried out under the same conditions as those indicated above. In the figure, the number N of cockroaches killed as a function of the number of hours of contact with the insecticide is plotted on the ordinate axis. 20 insects were initially introduced into each Petri dish.

The curves ($A_3$) and ($A_4$) correspond respectively to doses of 29 mg. and 229 mg. of m-acetylphenyl-N-methyl carbamate per square meter of neutral substance, while the curves ($B_3$) and ($B_4$) correspond to the same respective doses of α-naphthyl-N-methyl carbamate. The comparison curve (T) is a straight line which coincides with the abscissa axis.

Study of the curves clearly shows the undoubted superiority of the insecticidal activity of m-acetyl-phenyl-N-methyl carbamate with respect to α-naphthyl-N-methyl carbamate.

EXAMPLE 9

This example illustrates the bactericidal power of one of the products according to the invention. There was established experimentally, on the one hand, in respect of m-acetylphenyl-N-methyl carbamate and on the other hand in respect of borax, a known bactericide, the minimum concentration threshold necessary of these products for destroying different bacterial microorganisms.

The results set out in the following table show that the m-acetylphenyl-N-methyl carbamate (indicated by P) is active at doses distinctly smaller than those necessary when borax is used.

| Microorganisms | Threshold | |
| --- | --- | --- |
| | P | Borax |
| Staphylococcus aureus | $1 \times 10^{-5}$ to $1 \times 10^{-4}$ | $1 \times 10^{-2}$ to $1 \times 10^{-1}$ |
| Escherichia coli | Higher than $1 \times 10^{-4}$ | Higher than $1 \times 10^{-1}$ |
| Bacillus subtilis | $1 \times 10^{-5}$ to $1 \times 10^{-4}$ | $1 \times 10^{-2}$ to $1 \times 10^{-1}$ |

EXAMPLE 10

In order to study the fungicidal power of the products according to the invention, there was established the growth inhibition threshold of different fungoid growths in respect of m-acetylphenyl-N-methyl carbamate (indicated by P) and on the other hand in respect of sodium fluoride, a fungicide in current use in commerce.

The strains investigated were the following:
CV: Coriolus versicolor Fr. ex. Linne
SN: Sterigmatocystis nigra Van Tieghem
CC: Coniophora cerebella Pers
CG: Chaetomium globosum Kunze ex. Fr.

The products were distributed in several classes, according to the dilutions of the impregnation solutions employed:

Class 0: impregnation solution with a concentration higher than $1 \times 10^{-2}$ Class 1: impregnation solution with a concentration between $1 \times 10^{-2}$ and $1 \times 10^{-3}$ Class 2: impregnation solution with a concentration between $1 \times 10^{-3}$ and $1 \times 10^{-4}$.

The results are set out in the following table:

| Product | Solvent | Strains | | | |
|---|---|---|---|---|---|
| | | CV | SN | CC | CG |
| P | Acetone | Class 1 | Class 1 | Class 2 | Class 1 |
| Sodium fluoride | Water | ..do.. | ..do.. | | |

EXAMPLE 11

The results of the biocidal action stated in Examples 8, 9 and 10 are confirmed by the use of the following compositions.

(a) A solution of 4% of meta-propionylphenyl carbamate in methyl-ethyl-ketone.

(b) Very fine powder of meta-acetylphenyl N-N-diethylcarbamate containing 1% of a tensioactive agent formed by the condensation of nonyl-phenol with 10 units of ethylene oxide. The powder is used after having been dispersed in water.

(c) A solution of 7% meta-acetylphenyl N-dichloro-(3, 4)-phenylcarbamate in monochlorobenzene.

(d) Aqueous emulsion containing about 17% of a solution of 5 g. of meta-acetylphenyl N-isopropyl-carbamate in 100 g. of perchloroethylene.

(e) Insecticide powder composed of 40 parts by weight of talcum, 35 parts of bentonite and 25 parts of m-acetyl-p-chlorophenyl N,N-diphenyl-carbamate.

What is claimed is:

1. A carbamic ester of the formula $$\begin{array}{c}R_1\\ \diagdown\\ \phantom{R}N-COO-\phantom{xx}\\ \diagup\\ R_2\phantom{xxxxxxxxxx}CO-R_3\end{array}$$

wherein $R_1$ and $R_2$ are each a member of the group consisting of hydrogen atoms, alkyl radicals having 1 to 4 carbon atoms, aryl and chloro substituted aryl radicals; and $R_3$ is an alkyl radical having 1 to 4 carbon atoms.

2. A carbamic ester of the formula $$\begin{array}{c}R_1\phantom{xxxxxxx}X_n\\ \diagdown\\ \phantom{R}N-COO-\phantom{xx}\\ \diagup\\ R_2\phantom{xxxxxxxxxx}CO-R_3\end{array}$$

wherein $R_1$ and $R_2$, which are the same or different, are hydrogen atoms, lower alkyl, phenyl, or chlorine-substituted phenyl; $R_3$ is a lower alkyl; X is chlorine; and $n$ is an integer of 0 or 1.

3. A meta-acylphenyl carbamate in which the acyl is selected from the group consisting of acetyl, propionyl and butyryl.

4. A meta-acetylphenyl-N-alkyl carbamate in which the alkyl is one of the radicals methyl, ethyl, propyl, isopropyl, butyl and isobutyl.

5. A meta-acetylphenyl-N,N-dialkyl carbamate in which the alkyl is one of the radicals methyl, ethyl, propyl, isopropyl, butyl and isobutyl.

6. A meta-acylphenyl-N-phenyl-carbamate, wherein the acyl is selected from the group consisting of acetyl, propionyl and butyryl.

7. A meta-acylphenyl-N-alkyl carbamate, wherein the acyl is selected from the group consisting of acetyl, propionyl and butyryl, while the alkyl has 1 to 4 carbon atoms.

8. A meta-acylphenyl-N,N-dialkyl-carbamate, wherein the acyl is selected from the group consisting of acetyl, propionyl and butyryl, while the alkyls have 1 to 4 carbon atoms.

9. A meta-acylphenyl-N-alkyl carbamate, wherein the acyl is selected from the group consisting of acetyl, propionyl and butyryl, while the alkyl has 1 to 4 carbon atoms and wherein 1 to 3 hydrogen atoms of the phenyl are substituted by chlorine.

10. A meta-acylphenyl-N,N-dialkyl carbamate, wherein the acyl is selected from the group consisting of acetyl, propionyl and butyryl, while the alkyls have 1 to 4 carbon atoms and wherein 1 to 3 hydrogen atoms of the phenyl are substituted by chlorine.

11. A meta-acetylphenyl-N-polychlorophenyl carbamate, in which the polychlorophenyl ring contains 2 to 3 chlorine atoms.

12. A meta-acetylphenyl-N,N-dipolychlorophenyl carbamate, in which the polychlorophenyl rings contain each 2 to 3 chlorine atoms.

13. A meta-acetylphenyl-N-alkyl-N-polychlorophenyl carbamate, in which said alkyl has 1 to 4 carbon atoms and the polychlorophenyl ring contains 2 to 3 chlorine atoms.

References Cited

UNITED STATES PATENTS 2,903,478  9/1959  Lambrech _____ 260—479
2,945,877  7/1960  Zima et al. _____ 260—471

LORRAINE A. WEINBERGER, *Primary Examiner.*

RICHARD K. JACKSON, *Examiner.*

L. THAXTON, *Assistant Examiner.*